Aug. 23, 1938.     H. G. LOMBARD     2,128,004
HAMMER DRIVEN SUPPORTING CLIP
Filed June 17, 1937
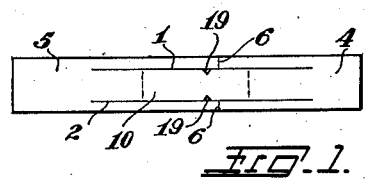
FIG. 1.
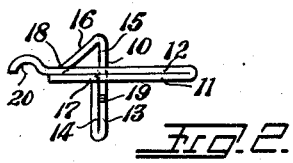
FIG. 2.
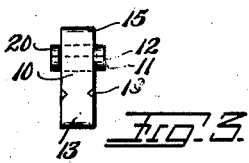
FIG. 3.
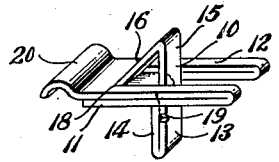
FIG. 4.
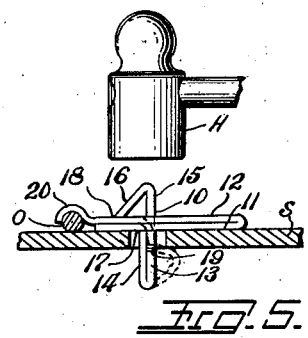
FIG. 5.
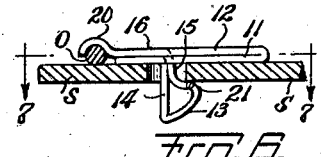
FIG. 6.
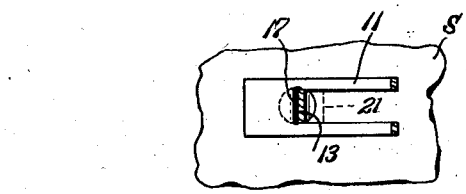
FIG. 7.     FIG. 8.
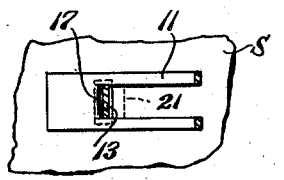
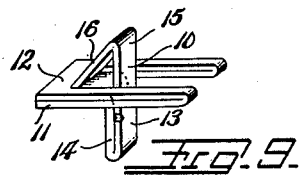
FIG. 9.
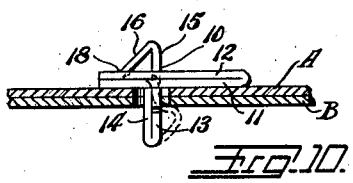
FIG. 10.
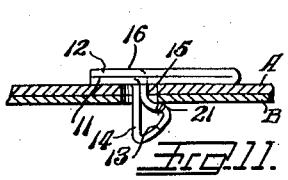
FIG. 11.
Inventor
By H. G. Lombard
Attorney Patented Aug. 23, 1938

2,128,004

UNITED STATES PATENT OFFICE 2,128,004

HAMMER-DRIVEN SUPPORTING CLIP

Herman G. Lombard, Washington, D. C., assignor to Albert H. Tinnerman, Cleveland, Ohio Application June 17, 1937, Serial No. 148,776

8 Claims. (Cl. 85—5)

This invention relates to means for mounting cables, conduits, electrical conductors, tube lines, rods, posts, and like objects in place upon a support.

More particularly, the invention is directed to stud fastening devices constructed from a minimum of relatively thin material of sheet or strip form, such as sheet metal, cold rolled metal, and the like, and designed for use in combination with conduits, cables and like objects for rigidly mounting the same in applied position on a support without danger of loosening or becoming accidentally removed incident to vibration, jarring and strain which may take place in the supporting member.

A specific illustration of the use to which the devices of this invention may be put is the mounting of the gas lines, conduits, and cables employed on automobiles. In mounting such objects, it is essential that the mounting means be capable of being easily and quickly applied and have a firm, rigid engagement in applied position on the chassis or frame in order to withstand vibration, jarring and strain incident to use of the automobile. If, as a result of such vibration or the like, slippage occurs to such extent that the object is loose in its mounting, dangerous wear and offensive noises will result.

At the present time devices employed for mounting cables, tube lines, and the like, are bulky and cumbersome and also are unnecessarily expensive in manufacture due to the amount of material required in their construction. Some arrangements embody a well known form of clamp consisting of a section of sheet metal disposed around the tube or other object and provided with an apertured projecting end seating on the support and secured by a separate bolt fastening passing through an aperture in the support and engaging with the projecting end of the clamp. Other constructions for mounting cables and like objects embody securing devices comprising clips provided with shanks having a substantial snap-stud engagement in apertures provided in the frame. This form of device consists of cooperating shank legs which are relatively yieldable to engage in the aperture in a friction or press fit. Such a friction press fit has been found hardly effective to maintain a clip in applied position over any extended period of time under conditions of continuous, hard usage such as, for example, takes place in an automobile frame and chassis.

In any event, the support, frame or other chassis part must be provided with an aperture to receive the shank of a bolt or clip. The devices herein proposed do not in any way complicate the supporting structure now in use since all that is necessary is a simple aperture to receive the stud member comprising the shank of the device, while at the same time a less expensive, more durable and easily and quickly installed mounting for an object is provided.

This invention therefore contemplates the provision of inexpensive securing devices which may be constructed from a relatively small section of substantially flat metal, such as sheet metal, spring steel, cold rolled metal, and the like, by a minimum of die operations and without loss or waste of material whatsoever.

A further object is to provide a device constructed from a substantially flat blank and having a shank structure in the form of a stud element comprising a continuous loop member adapted to be collapsed in an apertured part in a substantial expanding action to anchor the device and rigidly retain an object in applied mounted position on such part.

Another object is to provide in such a device, a loop-type stud member having a projecting portion to which the hammer blows or the like may be applied to distort the same and cause a collapse of the loop member into a deformation serving to lock the device in applied position in an aperture.

A still further object is to provide a device functioning substantially as a sheet metal rivet and having a stud portion applicable to superposed apertured members readily accessible from one side only and which may be distorted by means applied thereto from the accessible side to distort the stud portion and thereby rigidly connect the superposed members.

Further objects and advantages of the invention will be apparent to those skilled in the art as a description thereof proceeds with reference to the accompanying drawing in which like reference characters designate like parts throughout the same, and in which:

Fig. 1 represents a blank outline from which a form of the improved device may be constructed;

Fig. 2 shows in side elevation the device which may be constructed from the blank of Fig. 1;

Fig. 3 is an end view of Fig. 2;

Fig. 4 is a perspective of the completed device;

Fig. 5 shows the device as applied to a support for mounting a cable or the like, preparatory to the upsetting of the stud member;

Fig. 6 shows the device with the stud member upset and in applied position on the support;

Fig. 7 is a section on line 7—7 of Fig. 6 showing the application of the device in a round hole;

Fig. 8 is a similar view in a rectangular aperture;

Fig. 9 is a perspective of the device as designed for use as a sheet metal rivet;

Fig. 10 shows the device of Fig. 9 as applied for securing superposed apertured members; and Fig. 11 shows the device as upset and rigidly securing the superposed members in locked relation.

This invention contemplates the provision of a simple, one-piece fastening device for application to apertured work from one side of such work and comprises substantial loop-type stud members which may be passed through an aperture from one side of a support and then distorted from such side to expand the stud member inserted through the aperture whereby the device is fixedly retained in applied position mounting an object on the support. Such fastening devices are particularly useful in all-metal constructions in which holes in the support are provided as by punching or drilling and wherein the shanks of the stud fastenings are not accessible for upsetting after being inserted in the holes.

In another relation, the securing devices comprise a shank structure functioning substantially in the manner of a sheet metal rivet applied to superposed apertured parts accessible from one side only. In either use, the shank structure which is obtained for this purpose is, for the main part, a substantial loop element embodying a stud member adapted to be upset in an aperture and an integral projecting head portion which may be flattened, as by hammer blows, to cause an expansion, distortion and deformation of the stud portion in the aperture.

Referring to the drawing, Fig. 1 represents a blank from which a preferred form of the device may be constructed. The blank is a substantially rectangular section and accordingly may be obtained without waste from strip stock or sheet material of any suitable form such as sheet metal, cold rolled metal, and the like.

The blank is suitably slit within its periphery along lines 1, 2, to provide a continuous portion 10 integral with the peripheral portions of the blank as at 4, 5. The blank is then folded back upon itself as along dotted line 6 to the position illustrated in Fig. 2 to provide body portions 11, 12. The continuous portion 10, Fig. 1, is thus transformed into a substantial loop disposed in the cutout area of the superposed body portions 11, 12 as shown in Fig. 3. The loop thus provided may be suitably formed to provide a collapsible head member and an opposed stud member which may be distorted in an expanding action when the head member is flattened as hereinafter set forth.

Since the said stud member is in the form of a substantial loop it may be readily provided from a part of the continuous portion 10, of the blank, Fig. 1 to comprise elements 13, 14 in the form of a return bend integral with the body portion 11 as at 17. The collapsible head member is obtained from the remainder of the said continuous portion 10 by deforming the same into integral sections 15, 16 disposed at an angle to each other with the section 16 integral with the body portion 12 as at 18.

In order to weaken the stud member to such extent as to provide for a ready collapse thereof in an expanding action, weakening means such as notches or recesses 19 are provided in the stud element 13 as shown in Figs. 2 and 3. Such weakening recesses may be of any suitable outline and may be provided in the same stamping and slitting operation by which the blank is obtained as represented in Fig. 1. Preferably the said weakening notches are so disposed longitudinally of the stud element 13 as to ensure a collapse thereof at the most effective point depending on the thickness of the supporting member substantially as indicated by the dotted line position of the stud element 13 in Fig. 5.

As illustrated in Figs. 2, 4, 5 and 6 one of the body portions, preferably the upper portion 12, is so designed as to include an object engaging section 20 adapted to retain an object such as a tube line, cable, wire, or the like, in fixed relation on the support. This object engaging section 20 may be of any suitable shape but preferably is fashioned to the contour of the object to thereby snugly engage the same. Although the object engaging section is shown as provided from an end-edge of a body portion it is obvious that it may just as well be obtained from a side-edge thereof and, if desired, may embody cooperating sections provided from each of the said body portions.

After the stud member comprising shank elements 13, 14, has been inserted into an aperture in the support S, and in engagement with an object such as wire O, the head member comprising sections 15, 16, is flattened as by hammer blows by hammer H, Fig. 5, thereby causing a collapse and distortion of the stud member, particularly stud element 13, in an expanding action substantially to the position indicated by dotted lines in Fig. 5, and in full lines in Fig. 6, thus presenting a locking shoulder 21 in rigid engagement with the adjacent wall of the aperture. At the same time, the head section 16, being pivotally united with the body portion 12 at a point removed from the stud member, as at 18, may move about its pivot on being thus hammered to a position substantially flush with its associated body section 12 as shown in Fig. 6.

During the application of such hammer blows to the head member the stud element 14 which is suspended from the lower body portion 11 directly in the aperture, is not subject to any material deformation and accordingly will remain substantially rigid to effect a pronounced shoulder 21 in the cooperating stud element 13 thereby anchoring the stud in the aperture. The provision of this pronounced shoulder 21 in stud element 13 is further ensured by the weakening notches 19 which are disposed at such points as to form the shoulder at the most effective point depending on the thickness of the support. Of course, if a complete collapse of the stud member is desired such that the stud element 14 also is distorted, weakening means may be provided in this element whereupon the stud is anchored at a number of points in the aperture. It is to be noted that in the applied position of the stud member, the section 20 of the body portion engaging the object, is spaced from the adjacent surface of the support and accordingly grips the object under tension; this tension naturally is exerted on the distorted stud member to take up any possible looseness in its applied anchored position in the aperture.

In view of the foregoing it will be readily seen that the stud member has a function similar to that of a sheet metal rivet and is so permanently retained in its final applied position that removal thereof may not be effected without destruction of the same. And in this relation it will also be understood that the device provides a most rigid, permanent mounting of an object on a support thereby eliminating danger of loosening or accidental removal in installations subject to vibration and jarring effects as, for example, in the chassis or other supporting structure of an automobile.

As shown in Figs. 7 and 8, the lower body portion 11 presents a wide bearing surface providing a rigid seat on the adjacent surfaces of the support 8, while the stud member comprising elements 13, 14, is initially of such cross-section as to be admirably suited for use either in a round aperture as shown in Fig. 7 or a rectangular aperture as illustrated in Fig. 8.

Figs. 9-11 inclusive show an application of the device in which the object retaining element, Figs. 1-6 inclusive, may be omitted and the device employed for use as a sheet metal rivet for rigidly uniting superposed apertured parts A, B. The application of the device in this use is identical with that described above with reference to Figs. 1-8 inclusive.

It will be readily seen that the instant invention contemplates a simple and efficient one-piece device especially adapted for fastening engagement with a part accessible from one side only and provides a shank element readily adapted for insertion and locking engagement in an aperture in a support by means applied thereto from the accessible side of the support only.

It will further be appreciated that the improved device is capable of any number of uses in blind locations for mounting objects or rigidly uniting parts and is admirably adapted for most economical manufacture in quantity production to meet the severe, practical requirements of present-day use.

While the invention has been described in detail with specific examples such examples are illustrative only, since it will be apparent to those skilled in the art that other modifications within the spirit and scope of the invention may be constructed without departing from the teachings or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A one-piece device for mounting an object on a support, comprising a strip of sheet metal folded back upon itself to provide a body bearing on the support including a section engageable with the object to be supported, a loop member struck and formed from the body, said loop comprising a stud projecting from one face of said body to be received in an aperture in the support and a collapsible head member adapted to be deformed by hammer blows to cause a distortion of the stud member in anchored engagement in the aperture in the support.

2. A one-piece device for mounting an object on a support, comprising a strip of sheet metal folded back upon itself to provide a body portion embodying a pair of integral sections, a substantial anchoring member struck and formed from said sections including a stud projecting from one face of said body portion to be received in an aperture in the support, and an integral collapsible head member adapted to be deformed to cause distortion of the stud member in anchored engagement in the aperture in the support.

3. A one-piece device for mounting an object on a support, comprising a strip of sheet metal folded back upon itself to provide a body embodying a pair of superposed sections one of which is engageable with the object to be supported, a substantial loop member provided from said body and comprising an element struck from said sections, said loop being formed to provide a stud projecting from one face of said body to be received in an aperture in the support and a collapsible head member projecting from an opposite face of said body and adapted to be deformed to cause a distortion of the stud member in anchored engagement in the aperture to the support.

4. A one-piece device for mounting an object on a support, comprising a body bearing on the support and embodying a pair of superposed body sections formed by folding a sheet metal blank upon itself, a substantial loop member struck and formed from said body sections providing a collapsible stud element projecting from one face of said body to be received in an aperture in the support and a head member integral with said collapsible stud element and projecting from an opposite face of said body, said head member being adapted to be deformed to cause a distortion of the stud member in anchored engagement in the aperture in the support.

5. A one-piece device of the class described comprising a body member having bearing engagement on an apertured part, said body member comprising a pair of superposed body sections provided from a sheet metal blank folded back upon itself, a substantial anchoring member struck and formed from said folded body sections to present a stud element projecting from one face of said body to be received in the aperture in said part and a head member integral with said stud element and projecting from an opposite face thereof, said stud element being provided with weakening means adapted to ensure a collapse thereof in the aperture upon application of hammer blows to the said head member.

6. A one-piece device of the class described comprising a strip of sheet metal bent back upon itself to provide a pair of integral superposed sections forming a body having bearing engagement on an apertured part, a loop member struck from said integral superposed sections, a stud element provided from a portion of said loop and projecting from said body to be received in the aperture in said part, a head element formed from the remainder of said loop to project from said body in an opposite direction, said head element being adapted to be deformed to cause a distortion of the stud element in said aperture.

7. A one-piece device of the class described comprising a pair of integral superposed sections forming a body having bearing engagement on an apertured part, a loop member struck and formed from said integral superposed sections, a stud element provided from a portion of said loop and projecting from said body to be received in the aperture in said part, a head element formed from the remainder of said loop to project from said body in an opposite direction, and weakening means provided in said stud element to ensure a collapse thereof into a shoulder having anchoring engagement in the aperture upon application of hammer-blows to said head element.

8. A one-piece device for mounting an object on a support comprising a pair of integral superposed sections forming a body having bearing engagement on an apertured support, at least one of said sections having means for engaging the object to be supported, a loop member struck and formed from said integral superposed sections, a stud element provided from a portion of said loop member and projecting from said body to be received in the aperture in said support, a head element formed from the remainder of said loop to project from said body in an opposite direction, said head element being adapted to be deformed upon application of hammer-blows thereto to cause a distortion of the stud element into a shoulder having anchored engagement in said aperture such that the object is permanently mounted on said support.

HERMAN G. LOMBARD.